May 29, 1928. F. B. VAUGHN ET AL Re. 16,980
WELL PRODUCTION APPARATUS
Original Filed Jan. 29, 1925
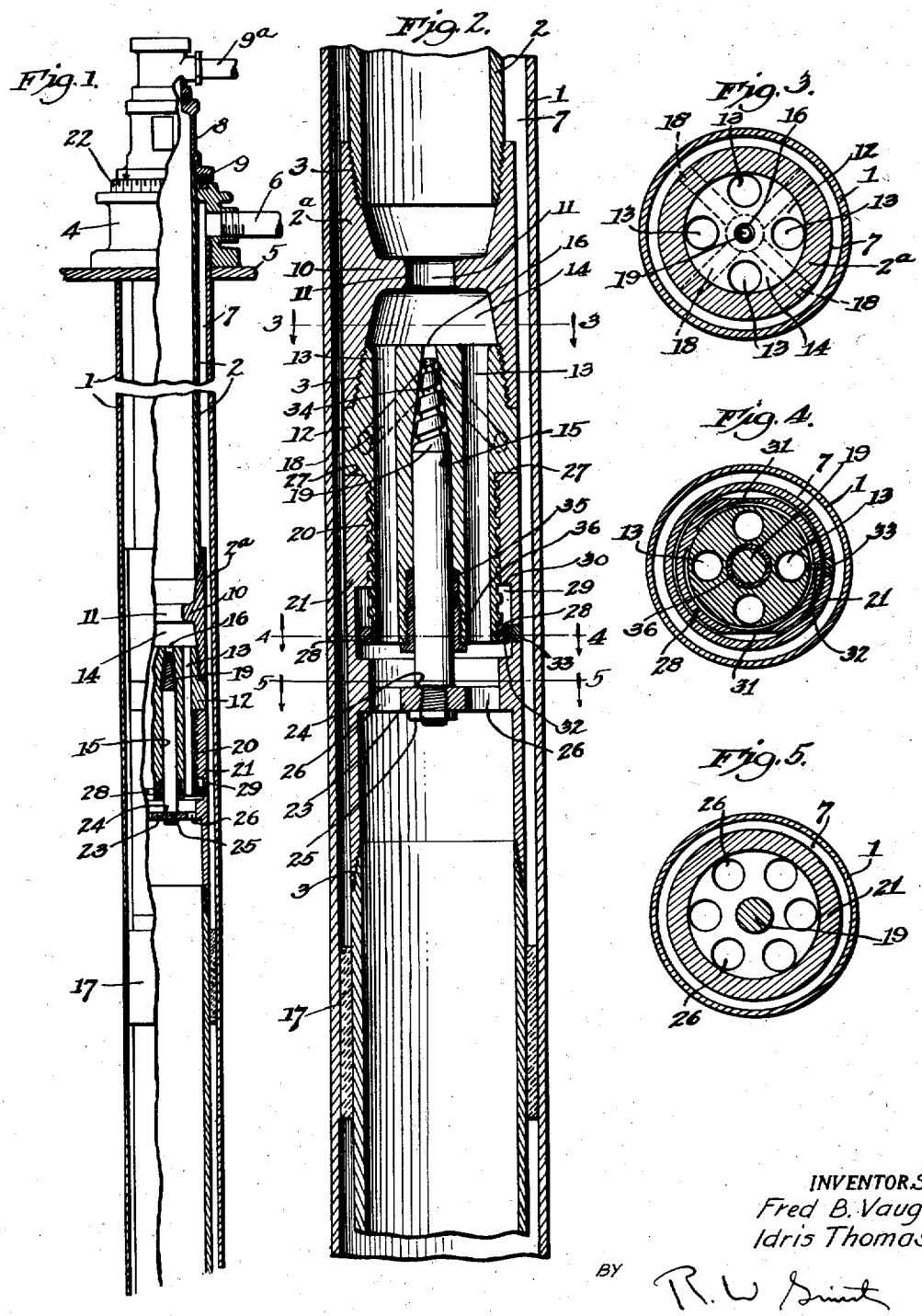
INVENTORS.
Fred B. Vaughn
Idris Thomas
BY R. W. Smith
ATTORNEY.

Reissued May 29, 1928. Re. 16,980

UNITED STATES PATENT OFFICE.

FRED B. VAUGHN, OF MAYWOOD, AND IDRIS THOMAS, OF WHITTIER, CALIFORNIA.

WELL-PRODUCTION APPARATUS.

Original No. 1,626,057, dated April 26, 1927, Serial No. 5,464, filed January 29, 1925. Application for reissue filed June 20, 1927. Serial No. 200,207.

This invention is a well production apparatus having a valvular control in the well tubing adjustable by manipulating the string of tubing from the ground level, the embodiment of the invention illustrated relating particularly to the production of oil and the like from a well, by discharging a jet of gaseous fluid under pressure upwardly into the column of liquid standing in the well, in order to elevate the column of liquid for discharge thereof at the ground level.

It is an object of the invention to provide extremely simple means for adjusting the valvular control, which in the present embodiment constitutes a jet mechanism submerged in the liquid in the well and adapted for regulation in accordance with variations in the pressure of the flow in order to obtain maximum production; and to operate the adjusting means from the ground level so that the valvular control in the well tubing may be adjusted without pulling the tubing.

It is a still further object of the invention to adjust the valvular control by rotating the portion of the string of well tubing which extends upwardly therefrom to the ground level, said upper portion of the string of tubing resting upon the well casing with anti-frictional means preferably provided between the parts so that the string of tubing may be readily turned.

It is a still further object of the invention to provide a valvular control in the form of a jet which will be of maximum efficiency as a result of arranging the same for spiral discharge into the liquid in the well.

The invention will be readily understood from the following description of the accompanying drawings, in which:

Fig. 1 is a vertical section through the bore of a well showing the invention embodied in a jet mechanism.

Fig. 2 is a vertical section through the jet.

Figs. 3, 4, and 5 are transverse sections on the lines 3—3, 4—4, and 5—5 of Fig. 2.

The present embodiment of the invention provides a fluid pressure jet mechanism illustrated in connection with the usual oil well construction including well casing 1 and a string of tubing 2 extending downwardly therethrough with the lengths of tubing connected by usual threaded means 3. In the form of the invention to be described a head 4 is mounted on the well casing at the derrick floor 5, and a pipe 6 communicates with the head for discharge into the annular space 7 between the casing and tubing.

The tubing 2 projects upwardly through head 4, and a collar 8 is fixed on the tubing so as to rest upon the head and thus support the string of tubing in the well casing. Anti-frictional means shown as ball bearings 9, are provided between collar 8 and head 4 to permit ready rotation of the collar so as to turn the string of tubing in the well casing for a purpose to be hereinafter described.

The column of oil elevated through the string of tubing is discharged through collar 8 into a pipe line 9 leading to suitable storage means.

Oil enters the string of tubing in the well in usual manner (not shown) and is adapted for elevation through the string of well tubing, the flow of oil being regulated by a valvular means which in the present embodiment of the invention is shown as a jet mechanism positioned at any desired point below the normal oil level.

As an instance of this arrangement, a length of the well tubing shown at $2^a$ is provided with an interior shoulder 10 forming a restricted central orifice 11 for the passage of oil upwardly therethrough. A plug 12 is fixed to the lower end of tubing $2^a$ by a threaded connection 3, so as to space the plug a short distance below orifice 11 and thus form an oil reservoir 14 between the latter and the plug. The plug is provided with longitudinal bores 13 for the passage of oil, and the parts are positioned in the well so that the normal level of the oil is above orifice 11, thereby filling the reservoir 14 and submerging the plug 12.

The plug 12 forms a jet at its upper end discharging into reservoir 14 so as to elevate the column of oil in the tubing 2 for discharge thereof through pipe line $9^a$. The jet is illustrated as comprising a central bore 15 in plug 12, tapering at its upper end to a restricted orifice through which a gaseous fluid under pressure is discharged into reservoir 14.

The gaseous fluid is preferably dry gas recovered from the flow from the well in usual manner, and forced downwardly through the annular space 7 by a compressor (not shown) connected to pipe 6. The annular space is closed below the jet mechanism by a usual packer 17 between the tubing and casing of the well, and the compressor maintains the gaseous fluid in the annular space at the necessary pressure to elevate the column of oil in the well tubing.

The gaseous fluid is discharged through the restricted orifice of bore 15 which forms a nozzle 16. The gaseous fluid is supplied to the bore 15 through radial bores 18 in plug 12, the bores 18 communicating at their outer ends with annular space 7, and inclining upwardly toward their inner ends which open into the tapering upper end of bore 15 adjacent discharge nozzle 16.

The discharge of the gaseous fluid through the restricted orifice of the jet is adjusted from the derrick floor without the necessity of pulling the tubing from the well. For this purpose a needle valve 19 is mounted in bore 15 with its tapering end extending through the tapering end of the bore, so that vertical adjustment of plug 12 relative to the needle valve will vary the discharge through nozzle 16.

The plug 12 may be vertically adjusted by means of a threaded connection 20 between the exterior of the lower portion of said plug and the interior of the upper portion of a barrel 21 forming the next lower length of the string of tubing 2. Barrel 21 is fixed to the lower portion of the string of tubing in the well by a threaded connection 3, and packing 17 is adapted to hold said barrel and the lower portion of the string of tubing against rotation in the well casing, while the upper portion of the string of tubing and the plug 12 connected thereto are adapted to be turned in the well casing, so as to vertically adjust the plug through threaded connection 20.

The needle valve 19 is mounted on the stationary barrel 21, so that vertical adjustment of plug 12 relative to said barrel will vary the discharge through orifice 16 of the jet; and the plug and upper portion of the string of tubing connected thereto, are rotated for vertically adjusting the plug, by turning collar 8 at the derrick floor. Graduations 22 cooperate with collar 8 to indicate the vertical adjustment of plug 12, and the connection 20 is of relatively coarse threads so that the plug may be appreciably vertically adjusted by relatively slight turning of the collar.

The mounting for needle valve 19 on the stationary barrel, may comprise a transverse partition 23 in said barrel in spaced relation below plug 12, with the lower end of the needle valve stem threaded through said partition, and a shoulder 24 on the valve stem clamped against the partition by a nut 25 threaded on the lower end of the valve stem.

Longitudinal bores 26 for the free passage of oil, extend through partition 23, the spacing of said partition below plug 12 providing an unobstructed passageway irrespective of the alinement of bores 13 and 26.

In order to limit the vertical adjustment of plug 12 relative to barrel 21, a shoulder 27 on the plug is adapted to abut against the upper end of the barrel so as to prevent wedging of the needle valve in bore 15 when the plug is lowered; and a collar 28 threaded on the lower end of plug 12 is received in an annular groove 29 in barrel 21, so as to abut against a shoulder 30 at the top of said groove and thus prevent disengagement of threaded connection 20 when the plug is elevated.

The parts are assembled with collar 28 removed from plug 12, and in order to permit insertion of said collar in the groove 29, opposite sides of the collar may be cut away as shown at 31, so that tilting the collar to vertical position with its cut away sides parallel to the bore of barrel 21, the collar may be inserted in the barrel and then turned back to horizontal position in groove 29.

Plug 12 is then threaded into barrel 21 so that final rotation of said plug will thread the same into collar 28; and the parts are preferably fixed in assembled relation by a screw 32 threaded through the collar and into the plug, the screw being placed in position through an aperture in barrel 21 which may be subsequently closed by welding or the like as shown at 33.

In order to obtain maximum efficiency of the jet discharging into the column of oil in the well tubing, the tapering end of needle valve 19 may be spirally grooved as shown at 34, so as to form a whirling jet.

A leak-proof joint is preferably provided between the stem of needle valve 19 and the lower end of the bore 15, by means of a stuffing box comprising annular packing 35 and a follower 36.

We have thus provided extremely simple but practical means for adjusting a valvular control in a string of well tubing by manipulating the tubing at the ground level, the valvular control being of any desired construction adapted to regulate the flow of the well, but being particularly applicable to a fluid pressure flow elevating means wherein the valvular control provides a jet lift mechanism.

We claim:

1. A well construction including well tubing, a plug forming a section of said tubing, said plug being connected to the portion of the string of tubing which extends upwardly therefrom and having threaded engagement with the portion of the string of tubing which depends therefrom so that turning of the upper portion of the string of tubing will raise and lower the plug relative to the lower portion of the string of tubing, said plug having a central bore and a longitudinal opening extending therethrough, the upper end of said central bore tapering to a restricted discharge orifice, said plug having a transverse bore communicating with its central bore and opening through the well tubing, a stem fixed to the lower portion of the string of tubing and extending into the central bore so as to close the lower end thereof, and valvular means associated with said stem and mounted in the tapering end of the central bore so that raising and lowering of said plug will regulate the discharge orifice of the central bore.

2. A well construction including well tubing adapted for reception in a well bore and comprising upper and lower sections, a plug in one section of the tubing having a bore opening longitudinally through the plug, a valve cooperating with said bore and fixed to the other section of the tubing, and a threaded connection between said sections of the tubing for moving the valve and plug relative to one another so as to regulate discharge from the bore of the plug by turning the upper section of the tubing at the top of the well.

3. Well tubing comprising upper and lower sections having an operating connection adapted to raise and lower the upper section relative to the lower section by turning the upper section, a plug in one of said sections having a central bore and a longitudinal opening extending therethrough, the end of the central bore tapering to a restricted discharge orifice, said plug having a transverse bore communicating with its central bore and opening through the well tubing, a stem fixed to the other section of the tubing, and valvular means associated with said stem and mounted in the tapering end of the central bore so that raising and lowering the upper section of the tubing relative to the lower section will regulate the discharge orifice of the central bore.

4. Well tubing comprising upper and lower sections having an operating connection adapted to raise and lower the upper section relative to the lower section by turning the upper section, a nozzle in one of said sections providing for elevation of liquid in the tubing by discharge of a fluid under pressure from the bore of the nozzle into the tubing, and a valve cooperating with the bore of the nozzle and fixed to the other section of the tubing so that raising and lowering the upper section of the tubing relative to the lower section will regulate discharge from the bore of the nozzle.

5. Well tubing comprising upper and lower sections having an operating connection adapted to raise and lower the upper section relative to the lower section by turning the upper section, a plug in one of said sections having a bore providing communication between the sections, said plug forming a nozzle, means for forcing fluid through the nozzle and into the tubing, and a valve cooperating with the nozzle and fixed to the other section of the tubing so that raising and lowering the upper section of the tubing relative to the lower section will regulate discharge from the bore of the nozzle.

6. Well tubing comprising upper and lower sections having an operating connection adapted to raise and lower the upper section relative to the lower section by turning the upper section, a nozzle in one of said sections, and a valve cooperating with the nozzle and fixed to the other section of the tubing so that raising and lowering the upper section of the tubing relative to the lower section will regulate discharge from the bore of the nozzle.

7. Well tubing comprising upper and lower sections having an operating connection adapted to raise and lower the upper section relative to the lower section by turning the upper section, a plug in one of said sections having a bore opening longitudinally through the plug, and a valve cooperating with the bore of the plug and fixed to the other section of the tubing so that raising and lowering the upper section of the tubing relative to the lower section will regulate flow through the bore of the plug.

In testimony whereof we have affixed our signatures to this specification.

FRED B. VAUGHN.
IDRIS THOMAS.